United States Patent [19]

Skogmo et al.

[11] Patent Number: 5,073,779
[45] Date of Patent: Dec. 17, 1991

[54] BEACON DATA ACQUISITION AND DISPLAY SYSTEM

[75] Inventor: David G. Skogmo, Billy D. Black, both of Albuquerque, N. Mex.

[73] Assignee: Sandia Corporation, Albuquerque, N. Mex.

[21] Appl. No.: 566,749

[22] Filed: Aug. 10, 1990

[51] Int. Cl.⁵ ............................................. G01S 9/56
[52] U.S. Cl. ....................................... 342/37; 342/36; 342/58
[58] Field of Search ............................ 342/37, 58, 36

[56] References Cited

U.S. PATENT DOCUMENTS

| | | | |
|---|---|---|---|
| 3,900,846 | 8/1975 | Gibbon et al. | 342/37 |
| 4,197,536 | 4/1980 | Levine | 342/37 |
| 4,319,243 | 3/1982 | Vachenauer et al. | 342/37 |

Primary Examiner—Mark Hellner
Attorney, Agent, or Firm—George H. Libman

[57] ABSTRACT

A system for transmitting aircraft beacon information received by a secondary surveillance radar through telephone lines to a remote display includes a digitizer connected to the radar for preparing a serial file of data records containing position and identification information of the beacons detected by each sweep of the radar. This information is transmitted through the telephone lines to a remote computer where it is displayed.

17 Claims, 3 Drawing Sheets (Prior Art)

BEACON DATA ACQUISITION AND DISPLAY SYSTEM

The United States Government has rights in this invention pursuant to Contract No. DE-AC04-76DP00789 between the Department of Energy and American Telephone and Telegraph Company.

BACKGROUND OF THE INVENTION

The aviation industry typically uses two types of radar to track the movement of aircraft.

A primary radar is used to detect the presence of any reflective airborne object. An advantage of this radar is that it detects all reflective aircraft; a disadvantage is that it does not enable the receiver to identify particular aircraft from the received signals.

A secondary radar is used to trigger a reply from transponders (beacons) aboard aircraft. An advantage of this radar is that the transponder provides aircraft identification and elevation information to the receiver; a disadvantage is that only aircraft carrying transponders provide a return signal to the receiver. Fortunately, all commercial and military aircraft, and most privately owned aircraft, now carry transponders, as they are required by the Federal Aviation Administration (FAA) for aircraft entry into controlled airspace at most major airports.

FIG. 1 shows the typical secondary radar signals. In particular, FIGS. 1A and 1B show "mode C" and "mode 3/A" signals transmitted by the ground to the aircraft. FIG. 1C shows a typical transponder signal transmitted when a signal is received from the ground. The distance of the aircraft to the radar transmitter is determined by measuring the time between transmission of a ground signal and receipt of a transponder response. The direction of the aircraft (azimuth) is determined by the direction of the transmitting antenna at the time the highly directional signal is transmitted.

The radar interrogates twice in mode 3/A and once in mode C at a frequency of 347 Hz. The mode 3/A signal asks a transponder to respond with the identity of the aircraft; the mode C signal asks for the elevation of the aircraft. As seen in FIG. 1, each signal has a pretrigger pulse $P_t$ followed by pulses P1, P2, and P3. The duration of each pulse is 0.8 $\mu$s, and the time between $P_t$ and P3 is 70 $\mu$s for each mode. However, the time between P1 and P3 is 21 $\mu$s for mode C and 8 $\mu$s for mode 3/A. This difference in time is used by both the transponder and the invention to tell which response is being transmitted from the aircraft. There is approximately 2.9 ms between successive pulses $P_t$.

The amplitude of pulse P2 is used by the transponder to prevent false responses when the antenna is not pointing at the aircraft. However, this information is not needed by the invention.

FIG. 1C shows the pattern of the transponder response to include 13 equally spaced pulse positions C1 through D4 equally spaced between framing pulses F1 and F2. All pulses in the transponder response have a pulse width of 0.45 $\mu$s, and each pulse position is separated from its neighbor by 1.45 $\mu$s.

Information is transmitted by the transponder to the ground as a series of octal numbers, A, B, C, D. As indicated in the figure, the pulse positions between F1 and F2 represent values 1, 2, and 4 for each of A through D. FIG. 1D shows a typical response to include pulses F1, A1, C2, A2, B1 and F2. The ground would interpret this information as having values of A =3, B =1, C =2, and D =0. If the information was received in response to a mode 3/A pulse, it would be interpreted as identity information; if it was in response to a mode C pulse, it would be elevation information.

Because the X pulse is not used in response to either mode, and because the D1 pulse is not used in response to mode C, the aforementioned system provides 4096 possible codes for identification and 2048 possible codes for elevation, a sufficient number to provide an indication of height in 100 foot increments between −1000 and +121,000 feet. The information is transmitted in a Gray code to minimize elevation errors due to transmission difficulties.

FAA radar is typically located at large commercial airports. Smaller airports, such as those used by private aircraft, are often located within the field of view of the FAA radar. While it is often desirable for the smaller airport to have access to the information from the FAA radar, because the radar can be receiving responses from a number of aircraft at any one time, the transmission of this amount of information has been quite expensive.

SUMMARY OF THE INVENTION

It is an object of this invention to provide a system for transmitting secondary radar information from an FAA radar to a remote location over standard telephone lines.

It is another object of this invention to provide a relatively inexpensive system for compressing secondary radar information for transmission over telephone lines, and for displaying the information with a computer.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a system for transmitting information from an aircraft transponder beacon received by a secondary surveillance radar, the beacons responding when generally aligned with the direction of maximum sensitivity of the antenna. Such a system includes azimuth input means for providing an azimuth signal representative of the direction of maximum sensitivity of the radar antenna and beacon video input means for providing a digital signal representative of information received by the radar from a beacon. A digital circuit removes azimuth and beacon information from the input signals while range determining means determine the range of the beacon from the antenna. Data processing means connected to the digital circuit include means for storing a record containing azimuth, range, and beacon information for each beacon detected during one sweep of the antenna; means for comparing beacon information from each beacon response with stored beacon information when the range information from said responses is identical to range information from a previous response, the comparison being used to validate the stored information; and means for creating a new record when the range information from the response is different from previously stored range information. Communicator means transmit the information of the stored records once for each sweep of said antenna to a remote display.

BRIEF DESCRIPTION OF THE DRAWINGS

The accompanying drawings, which are incorporated in and form part of the specification, illustrate an embodiment of the present invention and, together with the description serve to explain the principles of the invention.

DETAILED DESCRIPTION OF THE INVENTION

Figure 1:
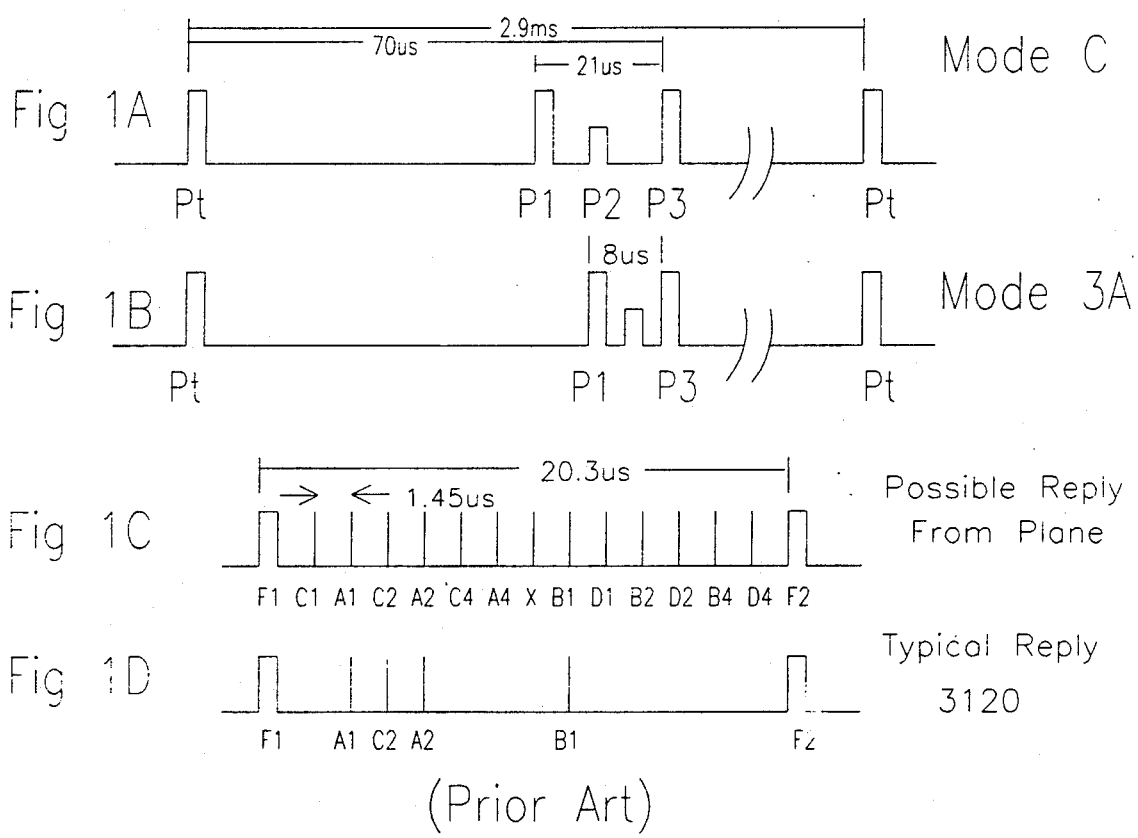
FIGS. 1A-1D show the transmitted and received signals of a secondary radar system.
Figure 2:
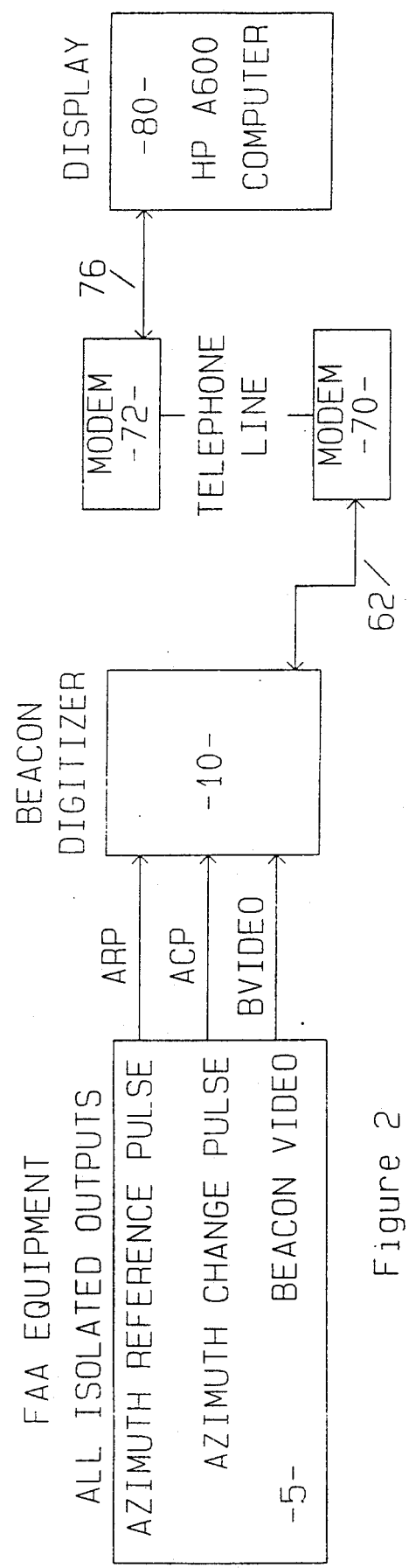
FIG. 2 shows a block diagram of the invention.

A beacon digitizer acquisition and display system, in accordance with this invention includes an FAA secondary radar 5 having a beacon video output BVIDEO for providing the transmitted mode C and mode 3/A signals from the radar and the received signals from the transducers. Radar 5 also has an azimuth change pulse output ACP from a shaft encoder that rotates with the antenna to provide 4096 digital pulses per revolution of the antenna shaft. An azimuth reference pulse output ARP provides a single pulse every time the rotating antenna passes magnetic north, or some other designated directions. One of ordinary skill in the art will readily find isolated locations in the radar for providing this information without compromising the integrity or accuracy of the radar.

The radar outputs are connected to beacon digitizer 10 where the transponder information is retrieved and condensed for transmission from modem 70 through a standard telephone line to a modem 72 and connection to a programmed computer 80 for display of the radar information, as discussed hereinafter.

Hardware

Figure 3:
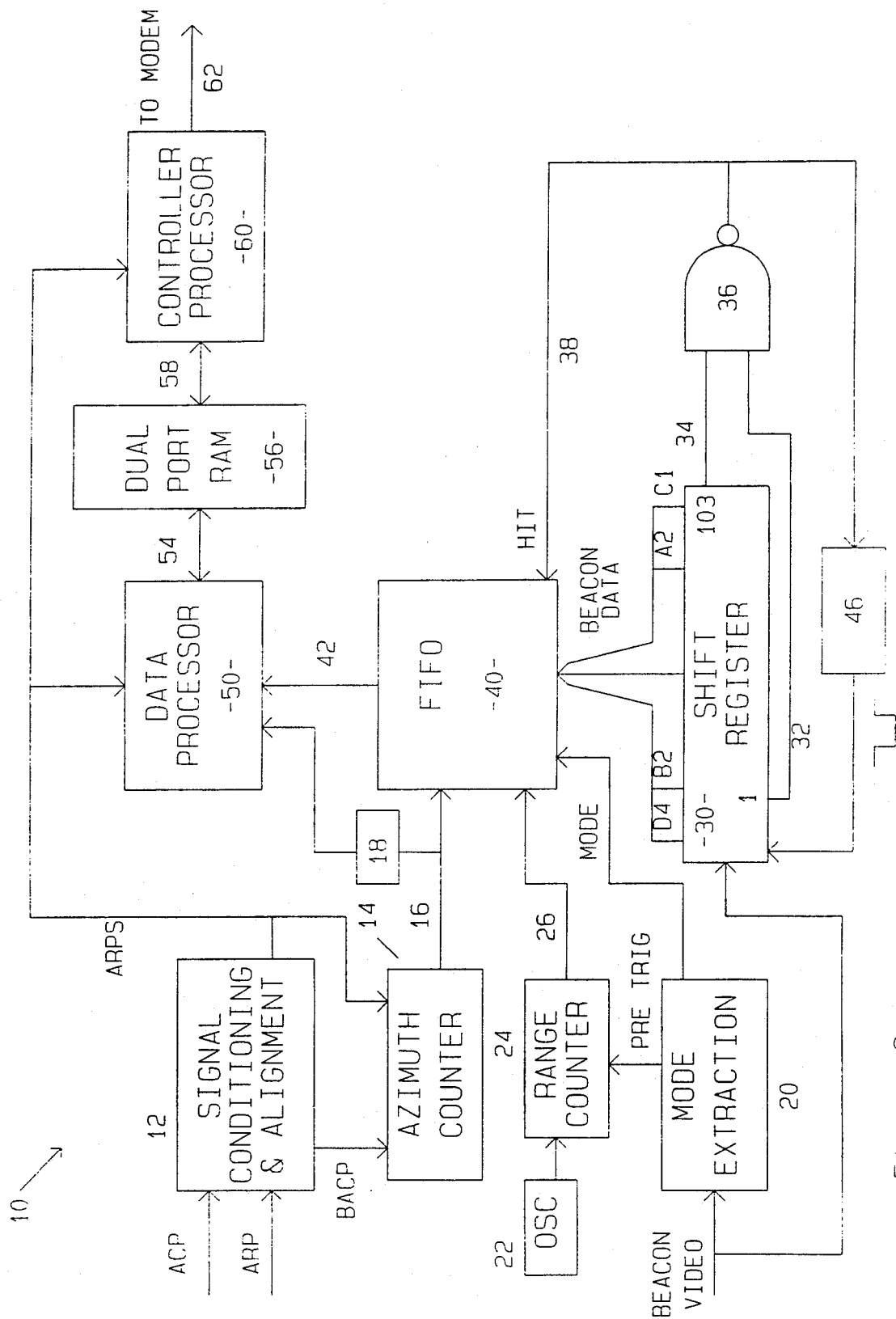
FIG. 3 shows a block diagram of the digitizer hardware employed at the secondary radar system.

FIG. 3 shows a block diagram of digitizer 10, which device functions to extract the identity of the transmitted mode from the P1-P3 spacing and to capture the data in each transponder response.

The signal ARP is a pulse provided by the radar once every 4.8 seconds when the antenna passes magnetic north. This pulse is conditioned in a conventional manner by signal conditioning circuitry 12 and outputted as a 500 μs pulse ARPS to each of azimuth counter 14, data processor 50, and control processor 60.

The signal ACP is an output from a shaft encoder that provides a pulse for each 1/4096th of a revolution of the antenna shaft. Since a shaft revolution takes approximately 4.8 seconds, ACP has a frequency of approximately 853 Hz. These pulses are also conditioned by circuitry 12 and outputted as signal BACP. Azimuth counter 14 continuously counts pulses from BACP until it is reset to 0 count by ARPS. At any instant, the ratio of the count in counter 14 to 4096 provides an indication of the direction of the radar antenna.

Mode extraction circuit 20 determines whether a transmitted pulse is mode C or mode 3/A. After pulse P3 is transmitted, the receiver may detect transponder responses for as long as 741 μs (60 nautical miles). After that time, the receiver is quenched and the BVIDEO line is quiet until the next pretrigger pulse $P_t$. In one radar upon which this invention has been tested, the quiet interval is approximately 2.2 ms. Since the maximum time from Pt of the transmitted signal to F2 of a response at maximum range is about 830 μs, a single-shot HC221 in extraction circuit 20 detects this quiet period by going into a low state 1.5 ms after it is triggered by any BVIDEO pulse. This low state holds the output of another HC221 high. The first BVIDEO pulse received after the 1.5 ms period has expired causes both HC221's to change states, resulting in a pulse output indicative of pre-trigger pulse Pt for the next transmitted pulse. This pulse is connected to range counter 24 as discussed hereinafter.

The mode is identified by a second pair of HC221's in mode extraction circuit 20. The first of these circuits switches states for 45 μs and then actuates the second circuit for 10 μs. If another pulse comes from BVIDEO during this window extending 45 to 55 μs after Pt, this pulse must be P1 of a mode C transmitted signal; if no pulse is detected during this window, transmitted signal must be mode 3/A, as only mode C and mode 3/A signals occur after a preliminary trigger signal. A binary signal is used to provide the mode information to FIFO 40.

A clock oscillator 22 provides timing information for the circuit 10. In a preferred embodiment, a 10 MHz oscillator is connected to a four bit counter such as an HC161. This device provides a 5 MHz system clock and user-selectable outputs of 2.5 MHz, 1.25 MHz, and 0.625 MHz. The selected output is fed to a 12 bit counter that is cleared by each pretrigger pulse Pt. FIFO 40 reads the value of this counter when a transponder pulse is detected. For each count at 2.5 MHz, the plane is a cell distance of about 197 feet from the antenna; for each count at 1.25 MHz, about 394 feet; for each count at 0.625 MHz, about 787 feet. A fixed distance error, corresponding to the time between Pt and P1 and the inherent delay in the transponder to respond is subtracted by data processor 50 from the count. The product of this count times the cell distance provides a digital representation of the distance of the plane from the antenna.

Shift register 30 is a 104 bit shift register which may be constructed from 13 serially connected 8 bit HC595 registers.

The BVIDEO signal is shifted through shift register 30 to recover the received information from the transponder. At the 5 MHz clock rate, the output of the 1st tap on line 32 and the output of the 103rd tap on line 34 are 20.3 μs apart. When logic device 36 detects the presence of pulses simultaneously at these taps, the pulse at the 103rd tap must be F1 and the pulse at the 1st tap must be F2 of the transponder signal shown in FIG. 1C. Only at that time, a HIT output is applied through line 38 to tell FIFO 40 a transponder has responded to the radar.

When F1 and F2 are at the 103rd and 1st taps, respectively, the information pulses in the transponder signal may be detected at designated taps corresponding in time to the location of pulses shown in FIG. 1C. For example, pulse B4 is found at tap 16 while B2 is either at taps 30 or 31. Each of these designated taps connects through data bus 44 to FIFO 40 which reads the designated taps when a HIT signal is present on line 38.

In practice, the HIT signal also triggers a pulse from single shot 46 that is used to clear the 1st 8 taps of shift register 40 prior to FIFO 40 reading the data (F2 is at tap 1, no signal data is at taps 2-8) to prevent a false count of two airplanes.

FIFO 40 may comprise 5 IDT7202 memories. Each of these Integrated Device Technology's First In First Out memory integrated circuits may have 1048 bytes rapidly written to its memory for temporary storage while the data is being read by a slower microprocessor. The hit signal on line 38 causes FIFO 40 to load the transponder data from shift register 40, the range output from counter 24, the azimuth output from counter 14, and the mode data from extraction circuit 20 (which data will be used to tell the circuit if the transponder data represents aircraft identity or elevation). Since the X bit is not transmitted by the aircraft transponder (this bit is not in use by the FAA), this bit is also loaded into FIFO 40 so that it may be checked to ensure that it is a zero.

The outputs of FIFO 40 connect through data bus 42 to data processor 50. In addition, data latch 18 is provided so that the azimuth count may be read by processor 50 at any time.

A preferred embodiment of processor 50 includes an 87C51 data processor, an HC573 latch to acquire strobed outputs of the 87C51, and additional RAM. The Intel 87C51 device has an internal erasable programmable read only memory (EPRAM) for program storage, and 128 bytes of internal RAM. It may access additional external program and data memory, as in processor 50. The latched outputs of processor 50 are connected to one side.

As discussed hereinafter, the first time an aircraft responds (HIT on line 38), data processor 50 opens a formation record for that range value. A 16 bit integrator is included in each formation record. As the antenna sweeps by a plane, the transponder makes approximately 40 responses to the radar interrogations over approximately a 116 ms period. During this response period, the antenna will have rotated through about 100 (9°) of the 4096 azimuth pulses that define a revolution (360°). To accurately locate the plane over this period means are provided as discussed hereinafter to take an average of the azimuth where the aircraft is first detected and where it is last detected to accurately determine its azimuth.

If the record had been declared valid, it is transferred to DPRAM 56 to be reported to control processor 60 at the occurrence of the next ARPS pulse signifying the antenna has passed its reference point. The azimuth value reported to processor 60 is the mid-point between the leading edge value and the azimuth value at closing.

As control processor 60 detects the ARPS pulse, it waits 10 ms to allow data processor 50 to load the number of detected aircraft and the address of the records into DPRAM 56, and then transfers the list of aircraft recorded during the last antenna sweep from DPRAM 58. Processor 60, which preferably is another 87C51 processor, an HC573 latch, and external ram, assembles this list into packets of up to 12 aircraft each and transmits this data through line 62 to modem 70 for transmission to the remote display terminal 80.

In a preferred embodiment, each of modems 70, 72 are Telebit T1000 modems, operating in Telebit's enhanced mode at 9600 bps. Although this modem is capable of auto-answer, this feature was not used in the preferred embodiment because of other considerations not related to this invention. Processor 60 was programmed to perform this function in order that the remote display unit could automatically dial-up beacon digitizer 10 at the radar location. Use of the auto-dial feature would be a routine matter to one of ordinary skill in this art.

The specific embodiment of the invention disclosed herein also includes relays (not shown) connected to processor 60 for controlling the power to modem 70. In the event that no communication occurs between processor 60 and display computer 80 for a predetermined period of time, these relays disconnect the power to modem 70, causing a system reset, and preventing a tie-up of the system. This feature is not part of the claimed invention.

In a preferred embodiment of the invention, display computer 80 is a Hewlett Packard A600 computer operating under the RTE operating system. This computer is connected through a serial port to modem 72 and is programmed with FORTRAN programs BCOM and MPPLN.

Software for Data Processor 50

An assembly language program for the Intel 87C51 microprocessor of data processor 50 manages the front end of digitizer 10.

The exchange of information between data processor 50 and controller processor 60 occurs in the top eight bytes of DPRAM 56 as follows:

7F8H: least significant byte of address for the data start;
7F9H: most significant byte;
7FAH: number of transponders detected during this revolution of the antenna;
7FBH: integrator threshold for azimuth detection;
7FCH to 7FFH unused.

The remainder of DPRAM 56 is configured as a loop of 255 8-byte records for storing data on 255 transponders. Each record in the loop contains the range, azimuth, identification, and elevation of the detected transponder. Each of these items requires 2 bytes.

The average azimuth value is found as follows: When a transponder is first detected by the leading edge of the sweeping transmitted beam (because its aircraft just entered the zone of radar coverage or because it was just activated at takeoff), a formation record is opened. As discussed below, at each azimuth value a 0 is shifted into a 16 bit integrator in the formation record. At those azimuths where a response is received (a response would be expected at one in every two or three azimuth change pulses, ACP), the 0 is changed to 1 and the total number of 1's in the integrator is counted. When this count exceeds a threshold (typically, 3). the response is declared valid and the instantaneous value of ACP is recorded as a leading edge azimuth value in the formation record.

When the beam passes the transponder, the transponder response is no longer received and the number of 0's in the integrator begins to increase. When the integrator only contains 0's, the record is closed and the instantaneous value of AGP is recorded as a closing azimuth value. Processor 50 calculates the mid-point between the leading and closing azimuth values to determine the azimuth of the transponder. Fixed errors in this azimuth value are subtracted from this reported value by display computer 80.

While the azimuth is being validated as discussed above, the identity and elevation values from each transponder response are also being processed. These records are held in the record formation space until the trailing edge is detected. This space is a loop of 16 byte formation records between C810H and D7FFH, where each formation record is as follows:
  bytes 15–13: unused;
  bytes 12 and 11: range most significant byte (msb) and least significant byte (1sb);
  bytes 10 and 9: confidence index for elevation and identity;
  bytes 8 and 7: elevation msb and 1sb;
  bytes 6 and 5: identity msb and 1sb;
  bytes 4 and 3: leading edge azimuth msb and 1sb;
  bytes 2 and 1: integrator msb and 1sb;
  byte 0: status byte.

The status byte indicates if a leading edge has been detected and if the estimates for either identity or elevation have been frozen (because a threshold number of identical hits has been passed).

The top 4 bits of identification and elevation are confidence indices which indicate the quality of the estimate of the value by counting the number of times the same data is measured. A "1" means minimum confidence (no reinforcing observations) and a "2" is increasing confidence. A "15" would be maximum confidence, but the system is typically operated by freezing the data values when the confidence reaches 4, as described hereinafter. A level of "0" means the data was garbled.

When a leading edge is declared, the transponder data (identity or elevation) that accompany the hit (determined by the mode bit in FIFO) are entered in the formation record with a confidence level of 1. A subsequent hit at that range with the response to the alternate mode (elevation or identity) will cause the entry of the alternative data with a confidence level of 1. The data are tested for integrity and, if garbled, they are dumped.

As stated above, when an aircraft transponder produces its first BVIDEO hit, a formation record is opened on its behalf. This record will start at an address indicated by the variable NXFRM (Next Formation), a variable chosen from the next unused value within the range of 1 through 255 (the maximum number of transponders this embodiment of the system can accommodate). The value of NXFRM is treated as a 16-bit address that has been encoded as 8 bits. The full 16-bit address is decoded as follows:
  right register the 8 bits in a 16-bit field;
  shift the 8 bits left 4 places while filling with 0's;
  add C800H to this result.

This procedure, for example, decodes the NXFRM address C0H (Decimal value =192) to the 16 bit code D400H. The record data is stored at D400H.

The encoded value of each open formation record address is stored in two places; the formation record register (FREG), and the formation address space (FAS).

FREG is simply a 255 byte section of memory where encoded addresses of open records are placed starting at the bottom and proceeding up for as many open records as exist (NMRECS). FREG provides a convenient list of the NXFRM values that are in use, while a count of the number of values in FREG provides a count of the number of transponders being received by the system.

FAS is a 2048 byte section of memory starting at C000H in which the encoded addresses of open registers are also kept. FAS is accessed on the basis of the range of the plane being processed in the record, and enables the system to quickly determine if each hit is an indication of a new beacon (which event would cause a new formation record to be formed) or a subsequent hit for a previously detected beacon. As a record index based on range, FAS prevents the processor from having to examine all records indicated in FREG to see if any should be updated with the new data. For example, if a FIFO record of a plane contained the range 125H, the NXFRM address of this plane would be stored in location C125H. If the next hit also has a range of 125H, processor 50 will find the address of the previous record at that range and direct the data from the new hit to that address. If no record existed with a range of 125H, a new record would be opened. If two planes happen to be at an identical range, their signal will be garbled; however, these planes are unlikely to be at an identical range (measured in cell distances of about 400 feet) for more than a couple of seconds.

When a plane is first detected (i.e., FAS(range) =0), the basic algorithm used by processor 50 operates as follows:
  open a formation record at the encoded address NXFRM;
  store that encoded address in FREG and FAS(range);
  increase NXFRM to the next available value;
  within the record, the confidence indexes are set =0;
  set the integrator =1.

The record is then processed at each azimuth change as described above. If an integrator reaches all 0's, it is closed. If threshold was never reached (as indicated by the record's status byte), the data are dumped as noise. If threshold was reached, the data in the record are transferred to DPRAM and the count of the number of planes is increased.

Once a transponder is detected, the identity and elevation of that transponder would not be expected to change during the 120 ms beam sweep across the aircraft. This knowledge is used to improve the identity and elevation information.

If the same values of identity and elevation are obtained on subsequent hits during the sweep, the confidence index is increased. If a different value of identity or elevation is obtained on a subsequent hit prior to the confidence index reaching a predetermined level (typically 4), the confidence index is decreased. If it reaches 0, this different value is used and the confidence level is again set to 1. If the confidence index reaches the predetermined value the data estimate is frozen and will not be changed. This status is indicated by setting a bit in the status byte. By thus freezing the estimate upon reaching a predetermined value, the system prevents replacing a valid data number with degraded responses that might occur as the beam begins to lose contact with a transponder.

Data processor 50 handles three measures of azimuth: AZ—the current direction of the antenna (the value in the AZ counter); AZF—the azimuth of a hit record in FIFO 40; and AZC—the calculational azimuth (the value of azimuth for which a 0 has been entered into the integrator of all open records).

The thrust of the program is as follows:
  If there is no data in FIFO 40, shift 0's into the integrator of all open records until AZC =AZ, the value of the direction of the antenna. This "idle" task keeps processor 50 ready to process FIFO data promptly as it occurs.
  As soon as there is FIFO data (indicated by a FIFO not empty signal), bring AZC =AZF and then make the integrator for that record =1.
  Count the number of 1's in the integrator and take the appropriate action.

Process the transponder data into the record.

Part of the task of removing data from the FIFO is to test its quality. The X bit of the response should always be 0. In mode C responses, the D1 bit should always be 0. If either of these tests are failed, the data is declared garbled and dumped. However, the integrator still gets a 1 shifted into it to indicate to the system that it has detected a transponder, even though the data from that transponder has not been decoded.

Software for Controller Processor 60

Controller processor 60 controls the interface between data processor 50 and display computer 80. A preferred embodiment of the invention uses the assembly language program CROM in the Intel 87C51 microprocessor of controller processor 60. A listing of CROM, and a document entitled "BEDADS Signal Protocol" which describes the commands and how information is exchanged between processor 60 and display computer 80 is provided in the Appendix to this specification.

Digitizer 10 is first energized by a request from an operator at display computer 80 when a signal is received through a serial port connected to the modem. A watchdog timer connected to processor 60 must be strobed periodically for processor 60 to continue normal program execution. If no communication occurs between processor 60 and display computer 80 for a predetermined period of time, relays in digitizer 10 disconnect power to the modem, causing a system reset. The signal initiates circuitry (not disclosed) at digitizer 10 that completes the modem connection. The strobing occurs until modem connection is made, when display computer 80 assumes that responsibility. The call is indicated by the "ring" message from the modem. After the ring message is received, processor 60 checks for a "connect fast" message to indicate that correct modem connection has been made with display computer 80.

Preferably, an auto-answer modem set may be used to initialize communication in a manner well known to those of ordinary skill in the art. This option was not incorporated into the prototype of the invention disclosed herein because of unrelated considerations. Once communication is established, constants in CROM are used to set the default operating parameters for data processor 50 through DPRAM 56. Controller processor 60 is now ready to transmit data after the receipt of a send data command from the display computer.

Upon receipt of the send data command, processor 60 waits for the next ARPS (azimuth reference pulse) signal to begin moving data from DPRAM 58. A pause of approximately 200 msec is included to ensure that data processor 50 has completed moving the data into DPRAM 58. The data is then quickly copied from DPRAM 58 to external RAM of processor 60 to allow data processor 50 to begin storing data into the DPRAM during the next antenna revolution while the communicator is transmitting data from the previous revolution.

Since each data group can contain the data for up to 12 beacons, the number of data groups is dependent upon the number of beacons which responded to interrogation during the last sweep of the radar. Processor 60 builds an 8 byte header record, group 0, organized as follows:
bytes 0-2 0 (data group number);
byte 3 number of data groups to be transmitted;
bytes 4, 5 MSB, LSB of ARP time (optional);
byte 6 even byte parity of bytes 0-5;
byte 7 even byte parity of bytes 0-6.

After group 0 is transmitted to display computer 80 a pause of approximately 0.5 sec allows display computer 80 to verify the group 0 parity and ask for retransmission, if necessary. Each of the transmitted data groups may be organized as follows:
bytes 0-3: data group number (identification)
byte 4: 0
byte 5: number of records in the group
bytes 6-101: up to 12 8-byte data record
byte 102: msb of sum of bytes 0-101
byte 103: lsb of sum of bytes 0-101.

Each data record within a data group identifies one beacon and is configured as follows:
bytes 0, 1: range lsb, msb;
bytes 2, 3: azimuth lsb, msb;
bytes 4, 5: identity lsb, msb;
bytes 6, 7: elevation lsb, msb.

The range value is in range cell values with the least significant bit representing the cell size (197, 394, or 787 feet) as selected in digitizer 10. The identity data has the least significant bit of the 12 identity bits in the least significant bit of byte 4. The four most significant bits are in the right side of byte 5. Elevation is in 100's of feet above sea level, coded in a gray code, as provided by the radar. The most significant nybble of identity and elevation contain the confidence index obtained for that data.

Transmission of each data group takes about 0.15 seconds through 9600 baud modem set 70, 72 over a standard telephone line following a successful group 0 transmission.

Processor 60 builds these data groups from the data copied from DPRAM 56 to external RAM 62. As each data group is built, it is moved byte by byte to a transmit buffer also located in external RAM. The data transmission starts with the formation of the first data byte and continues using a transmit interrupt handler until the transmit buffer is empty. The data records are continually added to the top of the transmit buffer until all data groups have been formed, while the transmit interrupt handler is transmitting the data from the bottom of the buffer on an interrupt basis. After all the data groups have been transmitted, display computer 80 can request the processor 60 to retransmit any of the data groups if any transmission errors are detected. When processor 60 finishes transmitting the data for one antenna revolution, it waits for the next command from the display computer.

Display computer 80 normally sends another "send data" command to the processor 60 after receiving the complete data report so that the data will continue to be transmitted after each antenna revolution. The watchdog timer is strobed each time processor 60 receives the "send data" command; failure to receive this command causes a hardware reset of digitizer 10.

Software for Display Computer 80

BCOM is a FORTRAN program written for the Hewlett-Packard A600 computer operating under the RTE operating system. This program gets beacon data from beacon digitizer 10. BCOM is scheduled by another FORTRAN program, MPPLN, that uses the data to form a display. BCOM expects that digitizer 10 has been initialized by MPPLN and is ready to send data.

BCOM starts operation by commanding processor 60 to send data from the next revolution of the radar. After a revolution is indicated by occurrence of the ARPS signal), digitizer 10 transmits group 0 to tell display computer 80 how much data to expect. BCOM checks the received group 0 for error. If no error is detected, the airplane data is read in groups, each group containing data for as many as 12 planes.

Each data group is also checked for error. If none is found, the data in that group are added to a growing array of airplane data being compiled for MPPLN. If an error is detected, the data in the error laden group are discarded. If there is time before the next revolution of the radar antenna, retransmission of the error laden group is requested of processor 60. The compiled array of airplane data is passed on to MPPLN. The digitizer is then told to send data for the next revolution of the antenna.

MPPLN operates on data provided by the communication program BCOM. which data is identical to the data from the formation records formed by data processor 50. MPPLN also queries the operator to obtain display parameters and current barometric pressure (elevation is a function of barometric pressure) and sets digitizer 10 to its default values, ready to accept the command to send data. MPPLN then prepares the display screen by drawing a map described by data contained in a disk file. (Alternatively, the map could be provided from a transparent overlay on the display screen.) The map is labeled with text contained in another disk file. Using the facilities of RTE, MPPLN schedules BCOM and passes it the tokens required for interprogram communication. MPPLN then suspends itself pending receipt of data from BCOM.

When the data are ready, MPPLN again becomes active. It combines reports that are probably from the same plane; i.e., reports that are within plus or minus one range cell, are within a certain azimuth span, and that do not have conflicting id numbers. These multiple reports can occur when the radar momentarily loses contact with a beacon during a sweep. In this event, when the signal is reacquired (as stated earlier, each beacon transmits about 40 times during one pass of the radar beam), the system may consider the response to be from a different beacon having an identical identification and almost identical calculated azimuth as the previous contact. For these close reports, it uses the elevation data having the highest confidence index.

Most of the MPPLN code dealing with the azimuth check relates to the difficulty of combining two reports when they span 0. For example, a hit at AZ =4090 and another at AZ =12 are within 1.6° of each other, even though their azimuth numbers are far apart. When combined, the azimuth used is a point midway between the two numbers. Fixed errors are then subtracted from the range and azimuth values.

MPPLN also provides a color display. To plot the data from the current sweep, the Gray coded elevation value is decoded using a lookup table to obtain the nearest 500 foot value. Then the 100 foot level adder is computed. If the elevation is less than 18000 feet, the local barometric pressure correction entered by the operator is applied. Next, the position of the aircraft is converted from integer polar to floating point cartesian coordinates. If a valid elevation is available the actual ground position of the plane is computed. Otherwise, the slant range is used and the actual position contains an error. Points plotted in this manner are displayed with an elevation of −2000 feet to indicate that no valid elevation is available. The current position is plotted in red/yellow flash and the beacon data printed beside the point. A record of the plotting action is made for future erasure actions. MPPLN then suspends itself again pending receipt of more data from BCOM. This cycle of operation continues until the operator halts the program.

Using the record of previous dot positions, each dot is replotted in green to show movement of the aircraft during the last 14 antenna sweeps. The records of old plotting actions are then shuffled down to fill the place just erased.

The particular sizes and equipment discussed above are cited merely to illustrate a particular embodiment of this invention. It is contemplated that the use of the invention may involve components having different sizes and shapes as long as the principle of converting transponder position and response information to a digital form for transmission through a conventional telephone line to a remote display unit is followed. For example, although the system is disclosed as transmitting data for detected planes within the entire circular field of view of a radar, it would be a routine matter to cause the circuitry to only respond to aircraft within a designated sector and between designated ranges, of the circular sweep. Thus, if the purpose of the remote display is to monitor planes flying near a sensitive facility, the system could be set to respond only to planes within that portion of the radar sweep containing the facility. Such a limitation removes additional clutter from the screen and reduces the amount of data that must be transmitted to the remote display. In addition, although the display computer is disclosed as a HP A600 using the RTE operating system, other computers such as IBM-compatible 80386 machines using MS DOS or OS/2 could also be readily programmed for this function. It is intended that the scope of the invention be defined by the claims appended hereto.

We claim:

1. A system for transmitting aircraft transponder beacon information received by a secondary surveillance radar to a display unit at a remote location from said radar, said radar periodically interrogating beacons through a directional antenna that is swept across a field of view, said beacons transmitting information only when generally aligned with the direction of maximum sensitivity of said antenna, said system including at said radar a digitizer comprising:

input means for receiving input signals from said radar containing information indicating the position of each beacon relative to said antenna and information received by said radar from each beacon;

information retrieval means, connected to said input means, for obtaining digital beacon location and identification information from said input signals;

data processing means for processing said digital beacon information, said means comprising;

means for storing a record for each beacon detected during one sweep of said antenna, each said record containing beacon information including the range of each beacon from said antenna; and communicator means for transmitting the information of said stored records once for each sweep of said antenna to a remote display, said communicator means comprising:

means for forming a header record setting forth the number of data groups to be transmitted; and means for forming a plurality of data groups, each group containing the number of beacon records contained in the group, each beacon record containing at least beacon location information; and means for transmitting the data groups only after receipt of a signal indicating that the header record has been received at said remote display.

2. The system of claim 1, wherein said data processing means further includes means for comparing beacon information from the most recent beacon response with stored beacon information when the range information from the most recent response is nearly identical to range information from a previous response, said comparison being used to validate the stored information.

3. The system of claim 2 wherein said data processing means only provides record information to said communicator means that has been verified by receipt of a plurality of beacon responses having nearly identical range information.

4. The system of claim 3 wherein each of said data processing means and said communicator means comprises a microprocessor, said data processing means further comprising a dual port RAM connected between said microprocessors, beacon information being passed from said data processing microprocessor to said dual port RAM after said data has been validated.

5. The system of claim 4 wherein said communicator microprocessor reads the validated information from said RAM once each sweep of said antenna.

6. The system of claim 2 wherein
said means for storing comprises a formation file containing one formation record for each detected beacon; and
said means for comparing comprises an index file containing range information and record address for each record in said formation file.

7. The system of claim 1 wherein said information retrieval means comprises:
circuit means for removing azimuth and beacon information from said input signals; and
range determining means for determining the range of said beacon from said antenna.

8. The system of claim 7 wherein said range determining means comprises an oscillator and a counter, said counter being enabled by an input signal indicative of transmission of a radar pulse, the count being read by said data processing means upon the occurrence of said logic means output, wherein the range of a beacon from the antenna is a function of the period of the oscillator times the count.

9. The system of claim 1 wherein said communicator means outputs to a modem for transmission of said information through a telephone line.

10. The system of claim 9 further comprising a pair of spaced modems in communication through a telephone line, one of said modems being connected to the output of said communicator means, the other of said modems being connected to a remote display.

11. The system of claim 10 further comprising a remote display consisting of a video monitor and a programmed computer comprising:
means for receiving the header group from said digitizer and requesting transmission of the data groups if the header group is not garbled.,
means for receiving data groups from said digitizer; and
means for displaying the position information of each beacon from said data groups on said monitor as a graphical representation of the position of the beacon relative to the antenna.

12. The system of claim 11 where said programmed computer further comprises means for displaying the elevation and identification information for each beacon response adjacent said graphical representation.

13. A system for transmitting aircraft transponder beacon information received by a secondary surveillance radar, said radar periodically interrogating beacons through a directional antenna that is swept across a field of view, said beacons transmitting information only when generally aligned with the direction of maximum sensitivity of said antenna, said system including:
azimuth input means for receiving from said radar an azimuth signal indicating the direction of maximum sensitivity of said radar antenna;
beacon video input means for receiving from said radar a digital signal containing information transmitted to and received from each interrogated beacon;
range determining means for determining the range of each said beacon from said antenna;
information retrieval means for removing beacon information from said input signals, said retrieval means comprising:
shift register means for serially receiving said digital signal from said beacon video input means;
logic means for providing an output indicating the presence of a received beacon signal when a predetermined combination of bits are located at a predetermined combination of taps of said register means; and
transfer means, responsive to said logic output, for outputting the contents of another combination of taps representative of information from said beacon;
FIFO storage means having inputs connected to said information retrieval means for storing azimuth and range information when said logic output occurs, and for also storing the output of said transfer means;
data processing means, connected to said FIFO for determining azimuth, range, and beacon information for each beacon detected during one sweep of said antenna; and
communicator means, connected to said data processing means, for transmitting to a remote display, after each sweep of said antenna, the azimuth, range, and beacon information stored during said sweep.

14. The system if claim 13 wherein said range determining means comprises an oscillator and a counter, said counter being enabled by a beacon video input signal indicative of a radar pulse, the count being read by said data processing means upon the occurrence of said logic means output, wherein the range of a beacon from the antenna is a function of the frequency the oscillator times the count.

15. The system of claim 14 further comprising means for adjusting the frequency of said oscillator to adjust the range of the range sensitivity of said recovered information.

16. The system of claim 13 wherein said data processing means comprises a microprocessor having inputs connected to said FIFO, and outputs connected to a dual port RAM.

17. A system for transmitting aircraft transponder beacon information received by a secondary surveillance radar to a display unit at a remote location from said radar, said radar periodically interrogating beacons through a directional antenna that is swept across a field of view, said beacons transmitting information only when generally aligned with the direction of maximum sensitivity of said antenna, said system including at said radar a digitizer comprising:

input means for receiving input signals from said radar containing information indicating the position of each beacon relative to said antenna and information received by said radar from each beacon;

information retrieval means, connected to said input means, for obtaining digital beacon location and identification information from said input signals;

data processing means for processing said digital beacon information from said input signals;

a formation file containing one formation record for each detected beacon, each said record containing beacon information including the range of each beacon from said antenna;

an index file of the range information for each record in said formation file;

means for creating a new record only when the range information from said response is different from previously stored range information in said index file; and communicator means for transmitting the information of said stored records once for each sweep of said antenna over telephone lines to a remote display.

* * * * *